US006320673B1

(12) United States Patent
Motosugi (10) Patent No.: US 6,320,673 B1
(45) Date of Patent: Nov. 20, 2001

(54) IMAGE FORMING AND COLOR CORRECTING SYSTEM

(75) Inventor: Toshihisa Motosugi, Okazaki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/038,537

(22) Filed: Mar. 11, 1998

(30) Foreign Application Priority Data

Mar. 12, 1997 (JP) .................................................. 9-057441

(51) Int. Cl.[7] .............................. G06K 15/02; G06T 7/60; H04N 1/52

(52) U.S. Cl. .......................... 358/1.9; 358/534; 358/441; 358/504; 382/286; 382/287; 382/289

(58) Field of Search ..................................... 358/456, 449, 358/448, 488, 1.9, 1.14, 441, 498, 296, 298, 518, 534, 504, 406; 382/298, 289, 162, 286, 287, 291

(56) References Cited

U.S. PATENT DOCUMENTS

| | | | | |
|---|---|---|---|---|
| 4,435,835 | * | 3/1984 | Sakow et al. | 382/291 |
| 4,648,048 | * | 3/1987 | Dorn et al. | 382/289 |
| 4,802,229 | * | 1/1989 | Yamada | 382/289 |
| 5,038,393 | * | 8/1991 | Nanba | 382/287 |
| 5,568,281 | * | 10/1996 | Kochis et al. | 358/488 |
| 5,798,773 | * | 8/1998 | Hiramatsu et al. | 347/19 |
| 5,818,976 | * | 10/1998 | Pasco et al. | 382/289 |

* cited by examiner

Primary Examiner—Scott Rogers
(74) Attorney, Agent, or Firm—Morrison & Foerster LLP

(57) ABSTRACT

Disclosed is an image forming and color correcting system. The system includes an image forming apparatus and a method for correcting halftone color in an image forming apparatus. The apparatus includes an image reading unit, an image forming unit and a parameter sensing unit. The units of the apparatus are controlled such that halftone color of a scanned document image are corrected when a parameter of the document is inside a predetermined range and a warning is given when the parameter is outside the predetermined range.

23 Claims, 6 Drawing Sheets

IMAGE FORMING AND COLOR CORRECTING SYSTEM

This application is based on Japanese application No. 09-057441, the content of which is incorporated herein by reference.

BACKGROUND OF THE INVENTION

1. Field Of The Invention

The present invention relates to an image forming system. Specifically the system relates to an image forming apparatus capable of halftone correction and a half tone correction method.

2. Description Of The Related Art

Conventional image forming apparatuses are known which are capable of forming images having halftones. In such image forming apparatuses, there are occasions when halftone correction is required due to the characteristics or condition of components within the apparatus. Halftone correction is typically accomplished by applying a calculation based on two image forming steps. In one step, a predetermined halftone pattern is recorded onto a recording sheet. In another step, the predetermined pattern is read off of the recording sheet.

When correcting halftones, a user must typically operate the image forming apparatus such that a predetermined pattern is recorded onto a recording sheet. The recorded pattern is then read using an image reader which is typically incorporated into the image forming apparatus.

Japanese Laid-Open Patent Application No. 8-25654 discloses an apparatus in which erroneous user-performed operations are avoided when correcting halftones. The image forming apparatus displays the various operations and sequences of halftone correction using a display unit. By displaying the halftone correction operations along with the proper sequencing steps, the apparatus assists the user's tasks.

When the predetermined pattern is printed onto a recording sheet and the sheet is subsequently placed at a predetermined position in an image reader unit to read the pattern printed thereon, a user may erroneously place the sheet at an unsuitable reading position. In conventional image forming apparatuses, the printed pattern is read regardless of whether the sheet is placed in an unsuitable reading position. Furthermore, there is no provision for safeguarding against this type of erroneous user operation. As a result, the pattern printed on the sheet must be re-read by the image reader unit after the user suitably replaces the printed sheet at the appropriate reading position.

An object of the present invention is to avoid the previously mentioned disadvantages by providing an image forming system capable of avoiding repetitive halftone corrections by a user.

SUMMARY OF THE INVENTION

In order to overcome the various problems associated with known image forming systems, there is provided an image forming and color correcting system. The image forming system includes an image forming apparatus comprising (a) image reading unit comprising means for scanning a document image, means for converting the document image into image data, and means for transmitting the image data to a signal processing unit within the image forming apparatus; (b) image forming unit comprising means for receiving the image data from the signal processing unit and means for forming the image data onto a recording medium; (c) parameter sensing unit comprising means for sensing a parameter of the document being scanned by the image reading unit; and (d) controller device for controlling the image forming apparatus comprising color correcting means for correcting color halftones of the document image, parameter calculating means for calculating whether the parameter sensed by the parameter sensing unit is within a preset parameter, and warning means for warning when the sensed parameter of the document is outside the preset parameter.

In various preferred embodiments, the parameter sensing unit comprises means for sensing document size; the parameter sensing unit comprises means for sensing document orientation; the image reading unit comprises a document table for positioning the document to be scanned; the means for warning a user comprises a visual warning display device; the means for warning a user comprises an audio warning device; the controller device comprises communication controlling means for controlling communication between the color correcting means, the calculating means and the warning means to engage the warning means to warn that the sensed parameter is outside the preset parameter prior to engaging the color correcting means to correct the color halftones of the document image; or the communication controlling means is an I/O control unit.

In other embodiment there is included a method for correcting halftone color in an image forming system comprising, (a) providing an image forming system comprising an image reading unit, an image forming unit and a parameter sensing unit; (b) scanning a document image in the image forming unit; (c) sensing a parameter of the scanned document in the parameter sensing unit; (d) determining whether the sensed parameter is inside or outside a predetermined parameter range; and (e) correcting halftone color of the scanned document image when the sensed parameter is inside the predetermined parameter range.

In yet another embodiment there is provided a step of warning when the sensed parameter is outside the predetermined parameter range. In further preferred embodiments the parameter is document size; the parameter is document orientation; or the warning is a visual warning or an audible warning.

DESCRIPTION OF THE PREFERRED EMBODIMENTS

Preferred embodiments of the image forming and color correcting system include an image forming apparatus and a method for correcting halftone color in an image forming apparatus. The apparatus includes an image reading unit, an image forming unit and a parameter sensing unit. The units of the apparatus are controlled such that halftone color of a scanned document image are corrected when a parameter of the document is inside a predetermined range and a warning is given when the parameter is outside the predetermined range. Examples of preferred embodiments of the present invention are described hereinafter with reference to the accompanying drawings.

Figure 1:
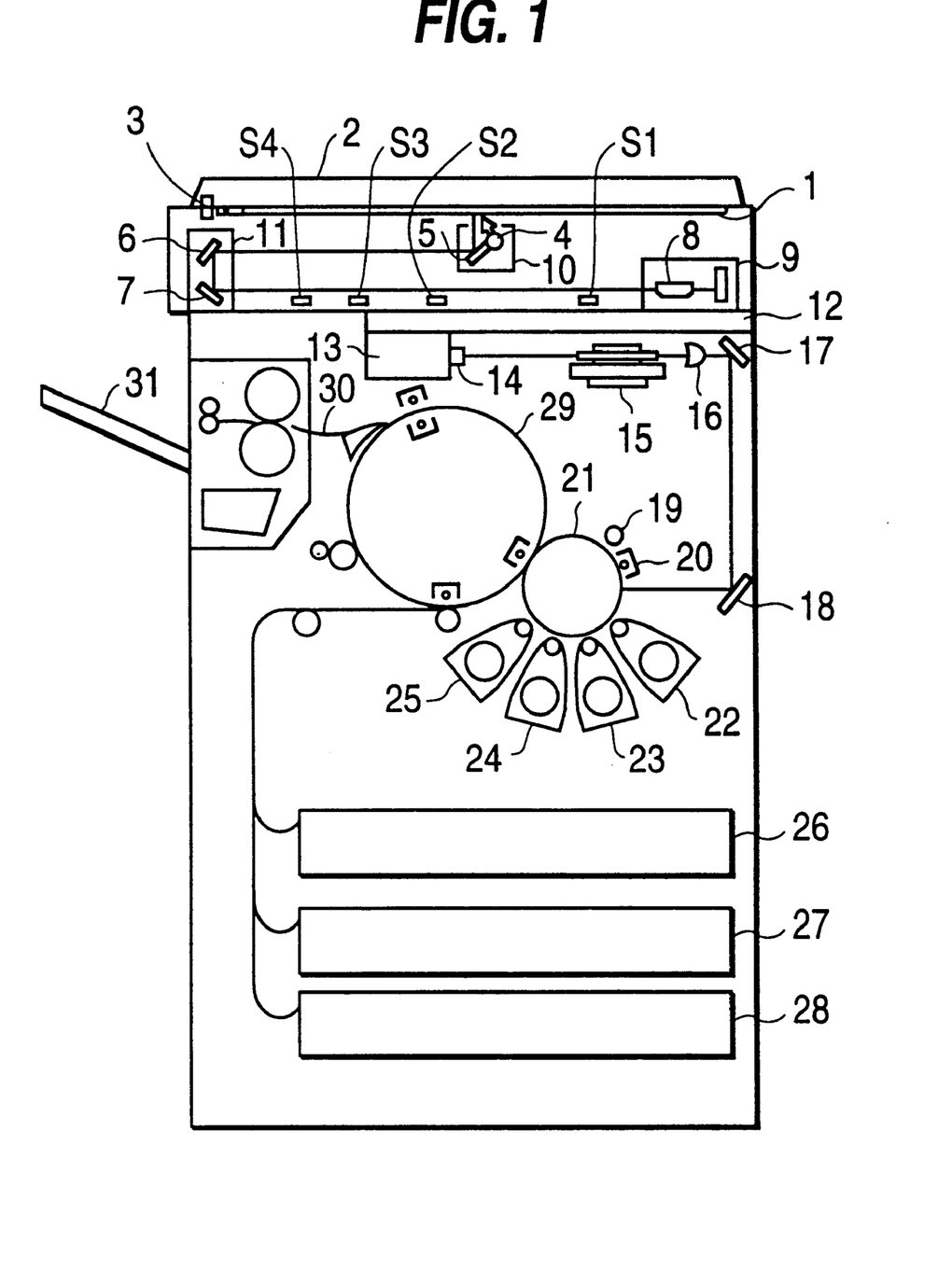
FIG. 1 is a simple section view showing one embodiment of a copying apparatus.

FIG. 1 shows one example of a preferred embodiment of the present invention in which an image forming apparatus comprises an image reading unit and an image forming unit. The image of an original document read by the image reading unit is scanned and converted to image data. An image corresponding to the image data is then printed onto a recording medium. In this embodiment, the printing of the image is accomplished by image forming unit which uses a standard electrophotographic printing system. Other than the electrophotographic printing system, an electrographic printing system, an ink jet printing system, a thermal printing system, a silver salt photographic printing system, and so on, may by employed as the image forming unit of the present embodiment.

In the image reading unit, a document is placed on a glass document table 1. An openable document cover 2 is closed so as to hold the document between the cover 2 and the document table 1. A document cover sensor 3 detects the opening and closing of the document cover 2. The document placed on the document table 1 is illuminated by an exposure lamp 4, and light reflected from the document is directed by mirrors 5, 6, and 7 and lens 8 so as to form an image on a full-color sensor 9 (CCD: charge-coupled device). The full-color sensor has three sensor arrays of red (R), green (G), and blue (B). In operation, a first scanner 10 supporting an exposure lamp 4 and a mirror 5 is mechanically moved at a speed V. A second scanner 11 supporting mirrors 6 and 7 is separately moved mechanically at a speed V/2 in a direction (sub-scan direction) perpendicular to the electrical scanning direction (main scan direction, i.e., a direction perpendicular to the sheet surface of FIG. 1) of full-color sensor 9 so as to scan the entire document.

In the image reading unit, a plurality of reflective type photo-sensors S1–S4 are arranged in the sub-scan direction of first scanner 10, such that the position or size of a document can be detected. Detection can be accomplished by opening the document cover 2. Detection may also accomplished by closing the document cover 2 over the document table 1 in a case where the surface of the document cover 2 is a mirror surface.

When scanning the first scanner in a sub-scan direction, a full color document image can be sensed by the full-color sensor 9. Full color information containing the red (R), green (G), and blue (B) components sensed by the full-color sensor 9 is transmitted to a signal processing unit 12 and converted to image signals having the color components yellow (Y), magenta (M), cyan (C), and black (Bk). These components are then transmitted to an image forming unit for forming the image onto a recording medium. Each Y, M, C, or Bk component is transmitted to the image forming unit by successive scanning of the document by the image reading unit. For full color image recording, a total of four scans is necessary.

In the image forming unit, the Y, M, C, and Bk image data signals received from the full-color sensor 9 of the image reading unit are used to modulate a laser diode 14 in accordance with the tone level of the image data signal via a laser diode driver 13. A laser beam emitted from the laser diode 14 is guided by polygonal mirror 15, f-θ lens 16, and mirrors 17 and 18 to form an electrostatic latent image on the surface of a photosensitive drum 21 which is uniformly charged by an eraser lamp 19 and a charger 20.

Developing units 22 through 25 comprise Y, M, C, and Bk developing devices. These four developing devices are sequentially brought into contact with a photosensitive drum 21 to develop the latent image formed on the surface of photosensitive drum 21 using a toner material. A recording sheet is supplied from sheet supply units 26, 27, or 28. The sheet is wound around a transfer drum 29, and a separate image of each color used in the photosensitive drum 21 is transferred onto the sheet as it is wound around transfer drum 29.

In this way a developed image of each color Y, M, C, Bk is transferred to the recording sheet, and a printed recording sheet is ejected into a tray 31 via a sheet transport path 30.

Figure 2:
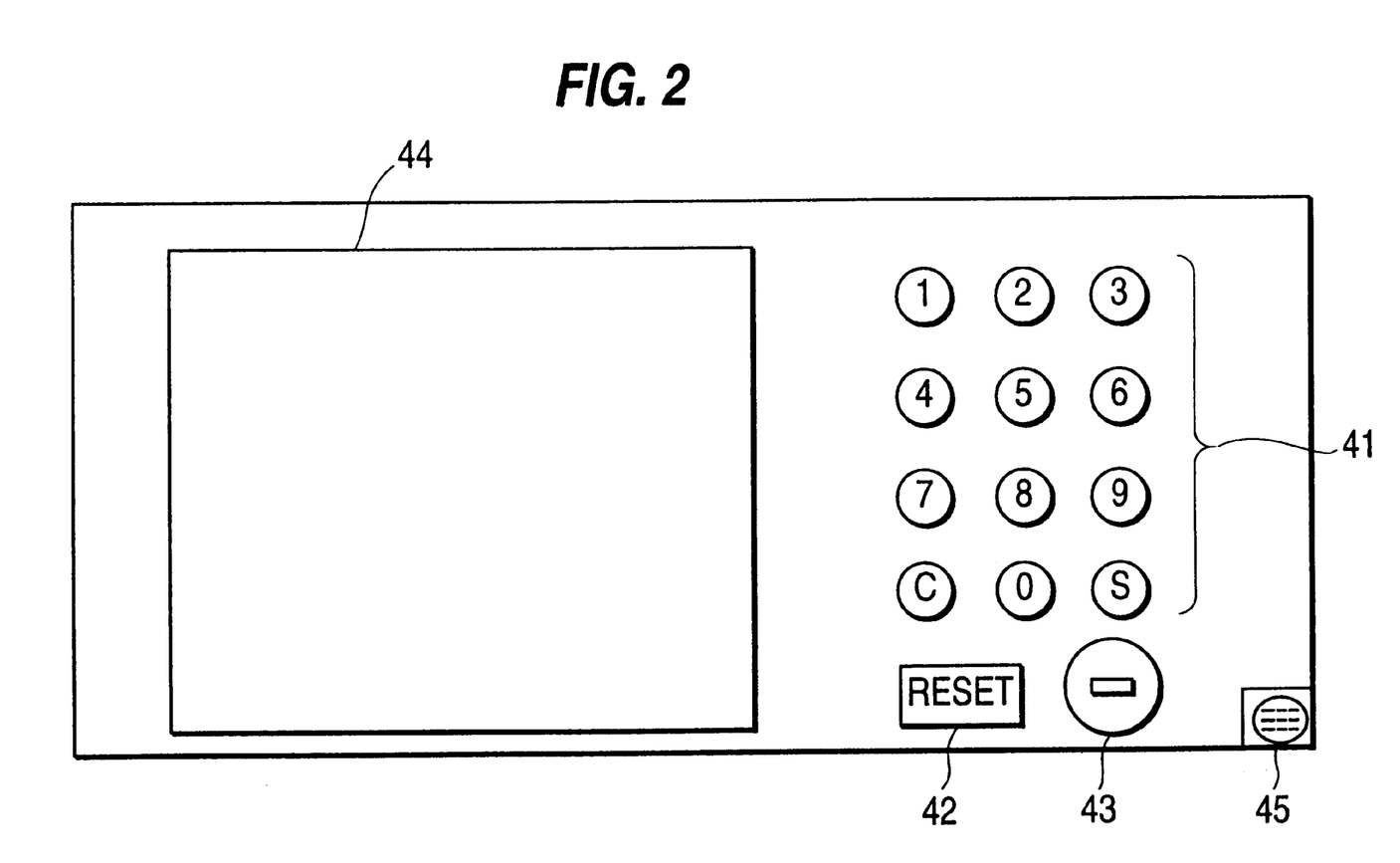
FIG. 2 is a plan view showing one embodiment of an operation panel which an be provided at the top of a copying apparatus.

FIG. 2 is a plane view showing one type of embodiment of an operation panel which can be provided at the top of an image forming apparatus. A ten-key pad 41 is used to enter numerical values such as the number of copies, magnification and the like. A reset key 42 is used to reset the copy conditions, and a print key 43 is used to start the copy operation. A touch panel 44 which can be provided on the operation panel displays various types of touch keys to set various operation modes. The various modes can be input by a user by pressing the touch keys. An alarm 45 can signal, for example, by generating an audible sound to alert a user to respond to an error in operation.

Figure 3:
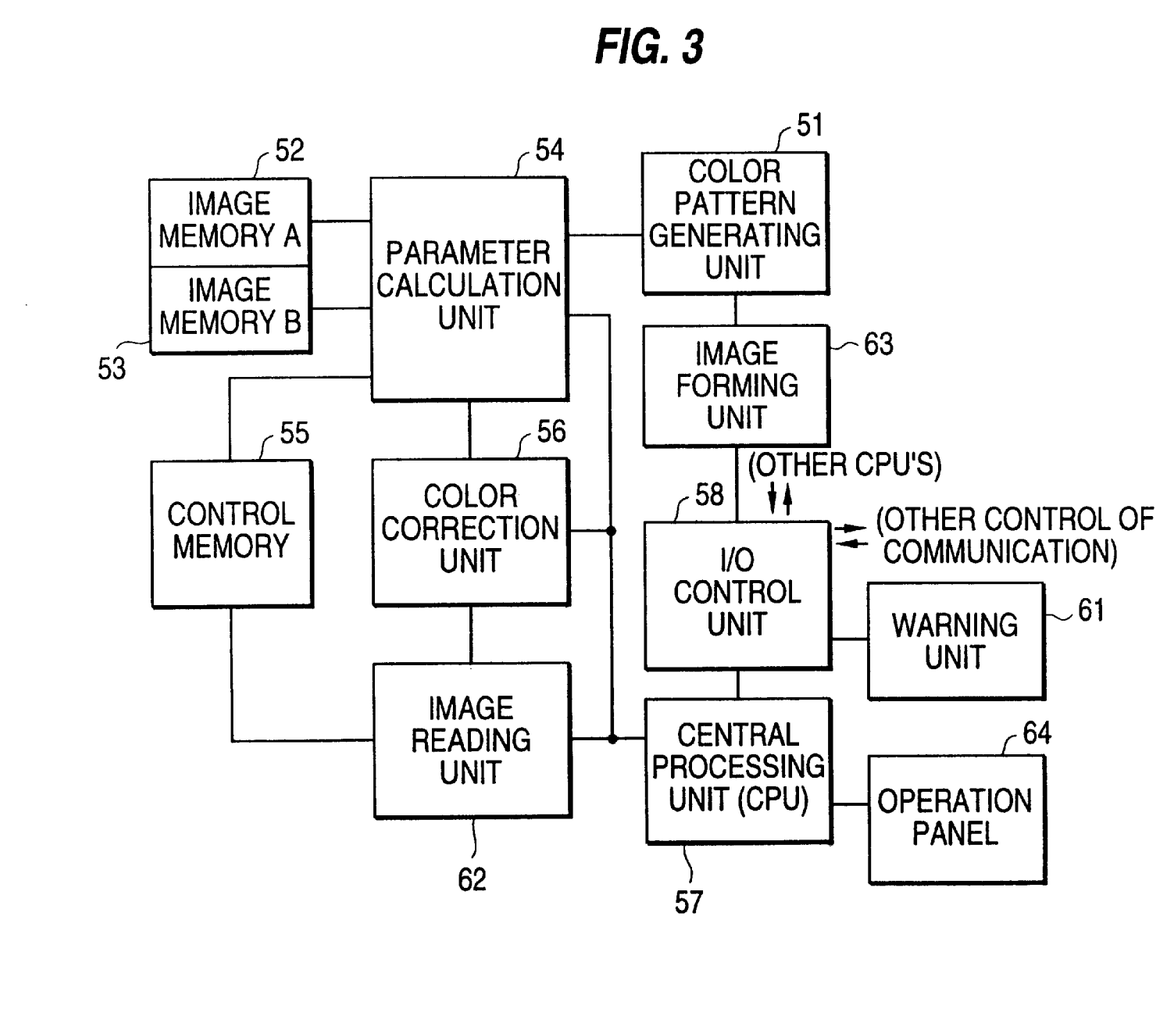
FIG. 3 is a block diagram illustrating a type of control unit which can be used with a copying apparatus.

FIG. 3 is a block diagram illustrating a type of controller device which can be used to control the image forming apparatus of this invention.

The controller device comprises a color pattern generating unit 51 to generate halftone patterns of each color. An image memory unit A 52 is used to store color reproduction information in order to reproduce each color from image data. An image memory unit B 53 is used to store halftone information of each color read by the image reading unit. A parameter calculation unit 54 is used to correct halftones of each color received from image memory unit A 52 and image memory unit B 53 during halftone correction. A control memory unit 55 is used to store the various copy conditions and print pattern conditions set at the control panel. The reading position and reading width when reading a pattern during halftone correction are determined by the print pattern conditions including the print position and print width.

The controller device of the present copying apparatus may further comprise a color correction unit 56 to correct halftone information of each color read by the image reading unit. A central processing unit (CPU) 57 is used to read information stored in the control memory unit 55 and to execute sequence processing based on the read information. An input/output (I/O) control unit 58 is used to control various communications with other CPUs and to control a warning unit 61. The aforesaid elements of the controller device provide the means for controlling image reading unit 62 to input image data, image forming unit 63 to form or reproduce images based on said image data, operation panel 64 to input operations by a user, and warning unit 61 to generate an audible or visual alarm, or both, as necessary.

Figure 4:
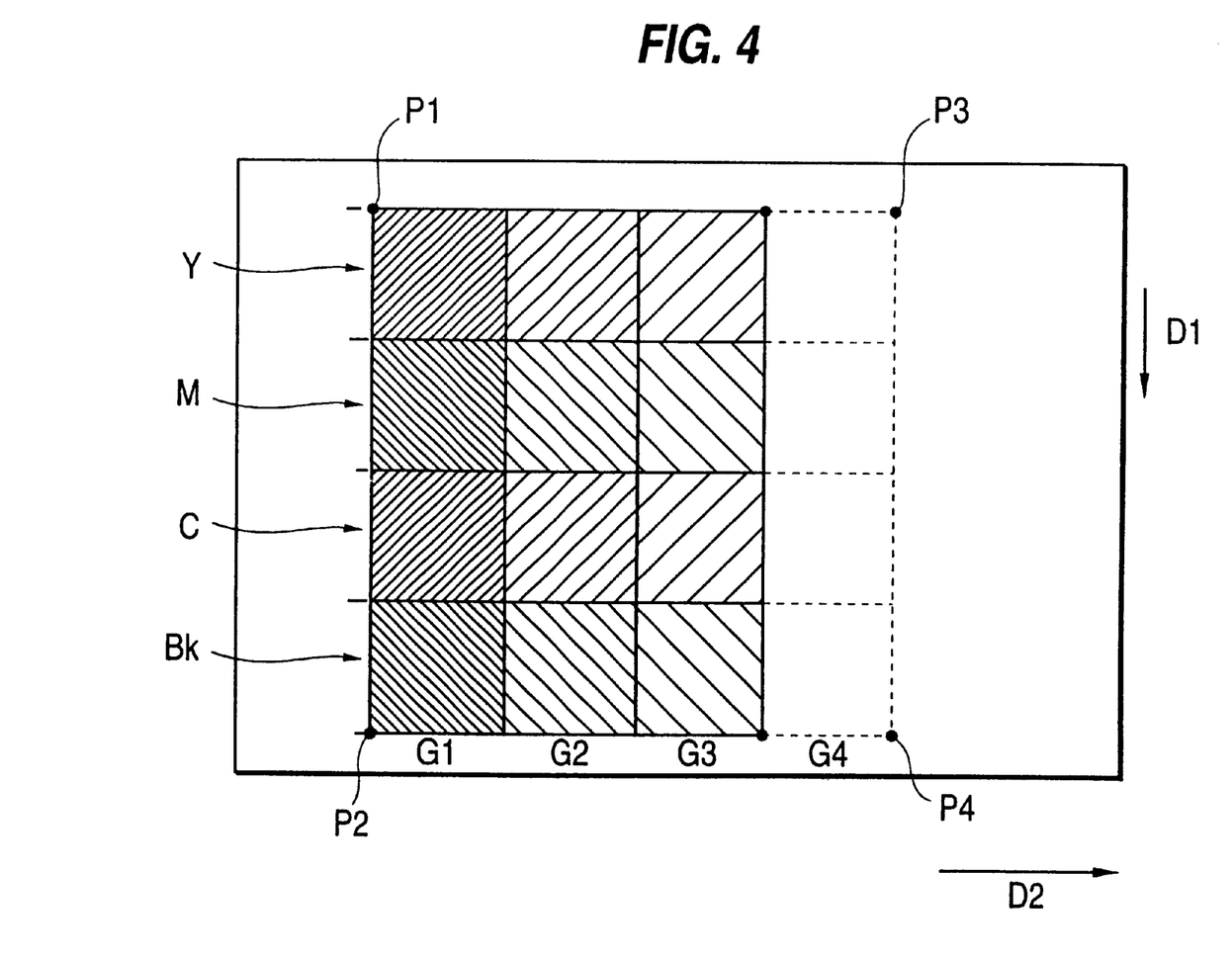
FIG. 4 shows a halftone correction pattern which can be used with a copying apparatus.

FIG. 4 shows a halftone correction pattern which can be used with a copying apparatus.

The halftone correction pattern is arranged for each color Y, M, C, and Bk in the main scan direction (a direction in line with full-color sensor 9 of FIG. 1, i.e., the direction indicated by arrow D1 in the drawing). Four-level halftone patterns G1, G2, G3, and G4 corresponding to each color are arranged in the sub-scan direction (moving direction of scanners 10 and 11 of FIG. 1, i.e., the direction indicated by arrow D2 in this drawing). The halftone patterns are arranged sequentially with diminishing densities. These patterns are printed onto a recording sheet.

In the halftone correction patterns, reference points indicating the start of the pattern in the sub-scan direction are designated as points P1 and P2. Reference points indicating the end of the pattern are designated as points P3 and P4. In use, the coordinates of the points change from white color data (i.e., the document background color) to data of each color. Changes from each color to white color are detected from linear read data in the main scan direction, and the coordinates of the points first detected in the sub-scan direction are designated as starting points P1 and P2. The coordinates of the points detected last are designated as end points P3 and P4.

Figure 5:
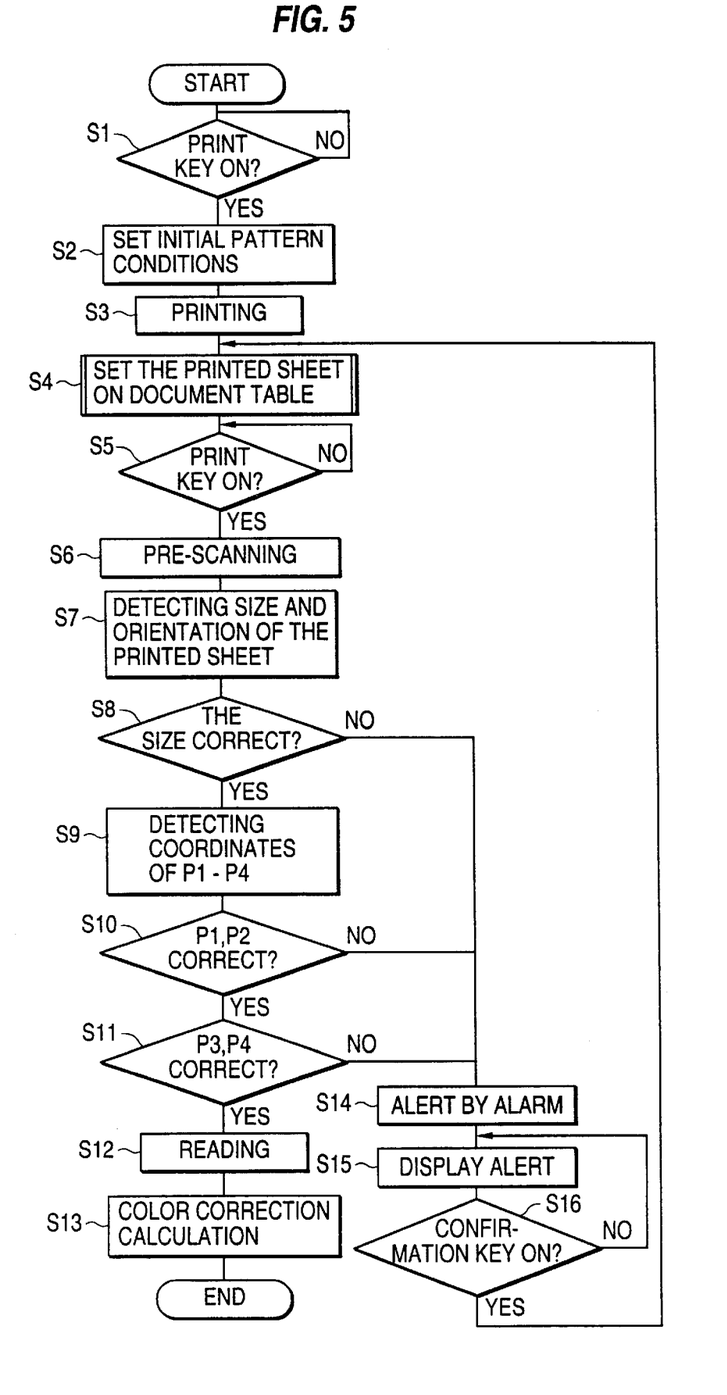
FIG. 5 is a flow chart illustrating one type of control sequence which can be used to correct halftones and which can be executed by a control unit.

FIG. 5 is a flow chart illustrating one type of control sequence which can be used to correct halftones and which can be executed by a control unit.

When the halftone correction mode is selected, first in step S1, a check is made to determine whether the print key 43 (refer to FIG. 2) has been depressed. If print key 43 has not been depressed (step SI: NO), the process stops at step S1. If the print key 43 has been depressed (step S1: YES), the process continues to step S2.

In step S2, the initial pattern condition generated by color pattern generator 51 is set based on the color reproduction information stored in the image memory A 52. In step S3, the pattern (refer to FIG. 4) is recorded onto a recording medium in accordance with the pattern condition. When a user places the document onto document table 1 (refer to FIG. 1) as step S4, another check is made in a step S5 to determine whether print key 43 has been depressed. If print key 43 has not been pressed again (step S5: NO), the process stops at step S5. If print key 43 has been pressed again (step S5: YES), the process continues to step S6.

In step S6, a pre-scan operation which is a preliminary operation in preparation for a scanning operation is executed. In step S7 the parameters of the document placed by the user are sensed by parameters sensors. Hence the parameter sensing unit not only senses the actual size of the recording sheet, but also the orientation of the recording sheet. In step S8, the size of the document detected in step S7 is compared with a recording medium size which is pre-stored in control memory 55 (refer to FIG. 3). A determination (i.e., calculation) is made as to whether the pre-stored size matches the size of the document. If the pre-stored size does not match the size of the document (step S8: NO), the process jumps to step S14. If the pre-stored size matches the size of the document (step S8: YES), the coordinates of the starting points P1 and P2 and end points P3 and P4 of the pattern shown in FIG. 4 are sensed in a step S9.

A check is made to determine whether the coordinates of starting points P1 and P2 match the coordinates stored in control memory 55. A check is also made to determine whether the coordinates of end points P3 and P4 match the coordinates stored in control memory 55. In steps S10 and S11, respectively, if any one of the coordinates of points P1 through P4 do not match the coordinates stored in memory (step S10: NO, step S11: NO), the process jumps to step S14. If all coordinates of points P1 through P4 match the coordinates stored in memory (step S10: YES, and step S11: YES), then in a step S12 the pattern such as that shown in FIG. 4 is read, and the 16 halftone patterns are stored as density data in image memory B 53 (refer to FIG. 3). In a step S13, color correction parameters are calculated by a parameter calculation unit 54 from the density data stored in image memory B 53 and the density data generated by color pattern generator 51 based on the color reproduction information stored in image memory A 52. The color reproduction information corresponding to the color correction parameters is the stored in image memory A 52. The main routine ends when these processes are completed.

Figure 6:
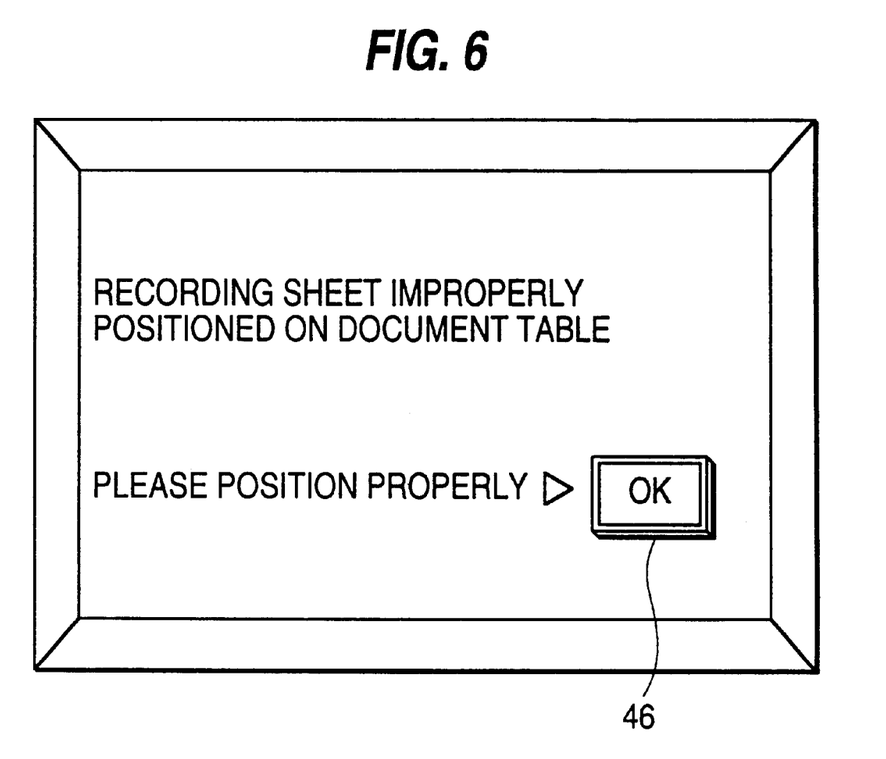
FIG. 6 shows an example of a type of warning device which can be included on a liquid crystal touch panel.

When the size of the document being recorded does not match the recording medium size (step S8: NO), or when any of the coordinates of points P1 through P4 do not match the coordinates stored in memory (step S10: NO, or step S11: NO), the process jumps to step S14. In step S14, the CPU 57 controls alarm 45 to emit an audible warning. In step S15 the CPU 57 controls touch panel 44 (refer to FIG. 2) a warning is displayed as shown in FIG. 6. In a step S16, a check is made to determine whether the confirmation key displayed on touch panel 44 has been pressed. If the confirmation key has not been pressed (step S16: NO), the process returns to step S15. If the confirmation key has been pressed (step S16: YES), the process returns to step S4.

In the aforesaid manner, when the size of the document being recorded does not match the recording medium size, or when the coordinates of any points P1 through P4 do not match the coordinates stored in memory, an alarm is given and a warning is displayed to both audibly and visually alert a user to a problem condition. This allows the user to re-position the document on the document table 1 before the document is read. Therefore, repetitive color corrections can be avoided.

Although a check is made to determine whether the coordinates of the detected points P1 through P4 match the coordinates stored in memory in steps S10 and S11 of the routine, the warning operation may be executed only when necessary by providing a margin for error in the stored coordinates insofar as such error margin does not impair the halftone correction operation.

FIG. 6 shows an example of a type of warning device which can be used with a control panel such as 01 a liquid crystal touch panel.

A message such as that shown in FIG. 6 (i.e., "Recording sheet improperly positioned on document table. Please position properly") is displayed when the size of the document being recorded does not match the recording medium size. The message can also be shown when the coordinates of any one of points P1 through P4 do not match the coordinates stored in memory to warn a user to reposition the document on the document table 1.

As described above, a user can be audibly or visually alerted to error conditions when the size of the document to be recorded does not match the size of the recording medium, or when the coordinates of any one of the points P1 through P4 do not match the coordinates stored in memory. This permits a user to re-position the document on the document table 1 before the document is read, and reduces errors in halftone color correction.

In the above mentioned embodiment, although the reflective type photo-sensors S1–S4 detects the actual size and the orientation of the recording sheet, this should not be construed as a limitation. For example, the actual size and the orientation of the recording sheet may be detected by the full-color sensor 9 during the pre-scan operation.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image forming apparatus, comprising:
    (a) an image reading unit for scanning a document image on a document, for converting the document image into image data and for transmitting the image data to a signal processing unit within the image forming apparatus;
    (b) an image forming unit for receiving the image data from the signal processing unit and for forming the image data onto a recording medium;
    (c) a parameter detector for detecting a parameter of the document and;
    a controller for correcting halftones of the document image, for calculating whether the parameter detected by the parameter detector coincides with a parameter of a correction pattern document stored in a memory and for warning when the detected parameter of the document is not the parameter of the correction pattern document.

2. The image forming apparatus of claim 1, wherein the parameter sensing unit comprises means for sensing document size.

3. The image forming apparatus of claim 1, wherein the parameter sensing unit comprises means for sensing document orientation.

4. The image forming apparatus of claim 1, wherein the image reading unit comprises a document table for positioning the document to be scanned.

5. The image forming apparatus of claim 1, wherein the means for warning a user comprises a visual warning display device.

6. The image forming apparatus of claim 1, wherein the means for warning a user comprises an audio warning device.

7. The image forming apparatus of claim 1, wherein the controller device comprises communication controlling means for controlling communication between the color correcting means, the calculating means and the warning means to engage the warning means to warn that the sensed parameter is outside the preset parameter prior to engaging the color correcting means to correct the color halftones of the document image.

8. The image forming apparatus of claim 7, wherein the communication controlling means is an I/O control unit.

9. The image forming apparatus of claim 1, wherein the parameter detector is separate from a sensor for scanning the document.

10. The image forming apparatus of claim 1, wherein the memory stores coordinates of a pattern on the pattern correction document, wherein the parameter detector detects coordinates of the pattern on the correction pattern document, and wherein the controller determines whether the detected coordinates coincide with the stored coordinate in the memory.

11. A method for correcting halftone color in an image forming system comprising:
    (a) providing an image forming system comprising an image reading unit, an image forming unit a parameter detector and a memory;
    (b) scanning a document image on a document in the image forming unit;
    (c) detecting a parameter of the scanned document in the parameter detector;
    (d) determining whether the detected parameter is not a parameter of a correction pattern document stored in the memory; and
    (e) correcting halftone color of the scanned document image when the detected parameter is the parameter of the correction pattern document.

12. The method of claim 11, comprising a step of warning when the sensed parameter is outside the predetermined parameter range.

13. The method of claim 11, wherein the parameter is document size.

14. The method of claim 11, wherein the parameter is document orientation.

15. The method of claim 12, wherein the warning is a visual warning or an audible warning.

16. The method of claim 11, wherein the parameter detector is separate from a sensor for scanning the document.

17. The method of claim 11, wherein the memory stores coordinates of a pattern on the pattern correction document, wherein the parameter detector detects coordinates of the pattern on the correction pattern document, and wherein the controller determines whether the detected coordinates coincide with the stored coordinate in the memory.

18. An image forming system comprising:
    (a) an image reading unit for reading an image on a document and for generating image data of the read image, said image reading unit comprising a detector which detects a parameter of the document positioned on a document setting portion;
    (b) an image forming unit for forming an image onto a recording medium;
    (c) a memory storing a parameter of a correction pattern document; and
    (d) a controller which controls said image forming unit to form a test image on the recording sheet, controls said detector to detect a coordinate of said recording sheet which is positioned on said document setting portion by a user, and warns of an abnormal condition of said recording medium in a case where the detected parameter is not the stored parameter of the correction pattern document.

19. The image forming system of claim 18, further comprising:
    a memory which stores a test image data for representing the test image, wherein said controller controls said image forming unit to form the test image on said recording sheet based on the test image data.

20. The image forming system of claim 18, wherein said detector detects a size of the document.

21. The image forming system of claim 18, wherein said detector detects an orientation of the document.

22. The image forming system of claim 18, wherein the parameter detector is separate from a sensor for scanning the document.

23. The image forming system of claim 18, further comprising a memory for storing coordinates of a pattern on the pattern correction document, wherein the parameter detector detects coordinates of the pattern on the correction pattern document, and wherein the controller determines whether the detected coordinates coincide with the stored coordinate in the memory.

* * * * *